T. Parker,
Fruit Can.

N° 60,547.  Patented Dec. 18, 1866.

Witnesses:
Eli J. Wilkinson
Edward Smith

Inventor:
Thomas Parker

United States Patent Office.

IMPROVEMENT IN SELF-SEALING FRUIT CANS.

THOMAS PARKER, OF GERMANTOWN, PENNSYLVANIA, ASSIGNOR TO HIMSELF AND THEODORE RUFE, OF SAME PLACE.

Letters Patent No. 60,547, dated December 18, 1866.

*The Schedule referred to in these Letters Patent and making part of the same.*

TO ALL WHOM IT MAY CONCERN:

Be it known that I, THOMAS PARKER, of Germantown, county of Philadelphia, and State of Pennsylvania, have invented certain new and useful Improvements in Self-Sealing Fruit Cans; and I do hereby declare that the following is a full, clear, and exact description of the construction of the same, reference being had to the ccompanying drawings, making a part of this specification, in which—

Figure 1 is an inside view of the lid.
Figure 2 is an edge view of the lid.
Figure 3 is a view of the can and lid combined.
Figure 4 is a top view of the can.
Figure 5 is a sectional view of the lid.
Figure 6 is a sectional view of the body of the can.
Similar letters in the figures represent the same parts.

To enable others skilled in the art to make and use my improvement, I will proceed to describe its construction and use.

The body and bottom of the can being formed of tin, and the lid glass, the full diameter has many advantages over other cans. My can has a much larger opening at the mouth than any other can in proportion, which is an advantage in putting the fruit in or taking it out without mauling or breaking. Second. After taking out the fruit you have a great advantage in cleaning, having no obstruction at the mouth, as is known in other cans; and after washing it can be thorougly dried and drained out. Third. This lid being secured on the inside gives the can a much neater appearance, and is much better for packing in boxes, having no outward projections on the can or lid. Fourth. The lid being made of glass, is a very desirable advantage in putting up fruit in cans, in seeing through it what kind of fruit you are buying, and whether it is large or small, good or bad, and it also saves labelling or marking the cans, which is generally done in putting up fruit.

Having described my improvement, and desiring to secure by Letters Patent, I claim—

1. I claim as my improvement the construction of a tin can with a glass lid the full diameter of the can, substantially as and for the purpose set forth.

Figure 1:
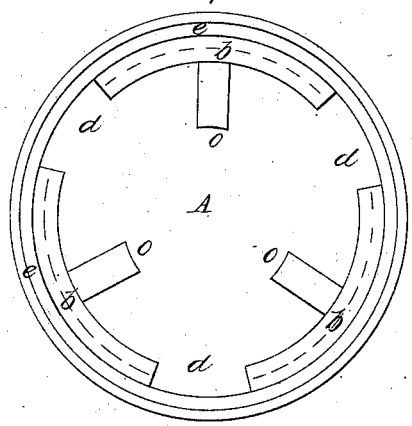
Figure 1 is an inside view of the lid A, with openings, $d\,d\,d$, for the reception of the lugs $s\,s\,s$, as shown in fig. 4, and brackets, $o\,o\,o$, acting as stays or supports for the flanges $b\,b\,b$, and rim $e\,e\,e$, upon which is placed a rubber ring, $r\,r$, as shown in fig. 3.
Figure 4:
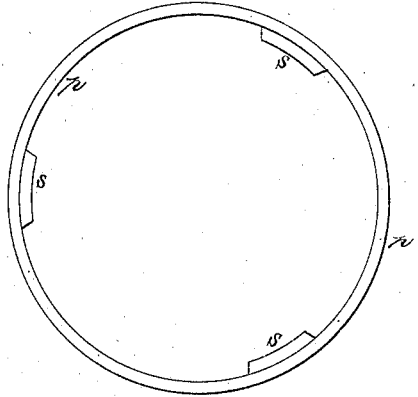
Figure 4 is a top view of the can, with its lugs, $s\,s\,s$, pressed in the body of the can, as shown in fig. 6, and rim $p\,p$ laid off as a bearing for rubber ring $r\,r$, as shown in fig. 3.
Figure 2:
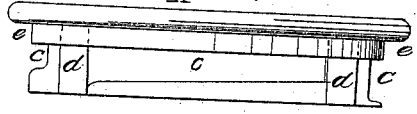
Figure 2 is an edge view of the lid A, with openings, $d\,d$, for the reception of lugs $s\,s\,s$, as shown in fig. 4, and its thread, $c\,c\,c$, that is sunk in the flanges, $b\,b\,b$, as shown in fig. 1, and rim $e\,e$, upon which is placed the rubber ring, $r\,r$, as shown in fig. 3.
Figure 5:
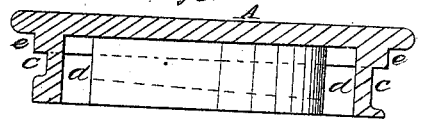
Figure 5 is a sectional view of the lid A, with its bearing, $e\,e$, for the rubber ring $r\,r$, as shown in fig. 3, and its thread, $c\,c$, and openings $d\,d$.
Figure 3:
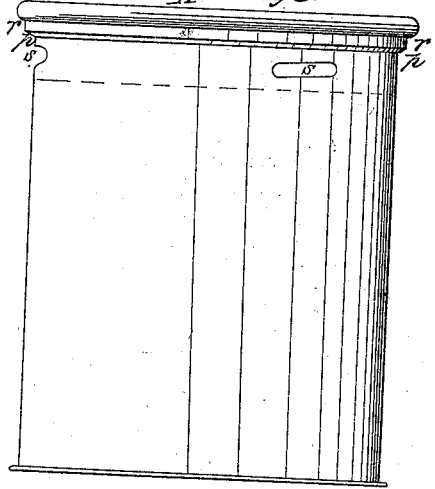
Figure 3 is a view of the can and lid combined, with its lugs, $s\,s$, acting as nut to the thread $c\,c\,c$, as shown in fig. 2, and rim $p\,p$ laid off in a suitable manner, as a bearing for rubber ring $r\,r$.
Figure 6:
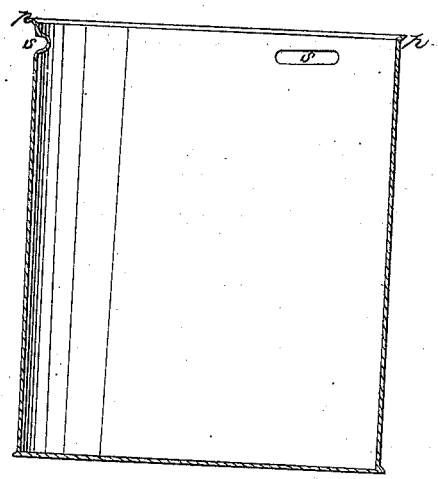
Figure 6 is a sectional view of the body of the can, which is a cylindrical circle closed at one end and open at the other, with its laid-off edge $p\,p$, and lugs $s\,s$, as seen in fig. 4.

2. I claim the laying off the top of the can as a bearing for the rubber ring $r\,r$, as shown in fig. 3, substantially as and for the purpose set forth.

3. I claim the impression of lugs sunk in the body of the can, or their equivalents, substantially as and for the purpose set forth.

In testimony whereof I have signed my name to this specification in the presence of two subscribing witnesses.

THOMAS PARKER.

Witnesses:
ELI J. WILKINSON,
EDWARD WILLIAMS.